United States Patent
Hao et al.

(10) Patent No.: US 11,228,664 B2
(45) Date of Patent: Jan. 18, 2022

(54) METHOD AND APPARATUS FOR ACQUIRING RPC MEMBER INFORMATION, ELECTRONIC DEVICE AND STORAGE MEDIUM

(71) Applicant: Beijing Baidu Netcom Science and Technology Co., Ltd., Beijing (CN)

(72) Inventors: Yu Hao, Beijing (CN); Fei Ma, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 0 days.

(21) Appl. No.: 17/204,078

(22) Filed: Mar. 17, 2021

(65) Prior Publication Data
US 2021/0203754 A1 Jul. 1, 2021

(30) Foreign Application Priority Data
Sep. 24, 2020 (CN) .......... 202011014305.X (51) Int. Cl.
*H04L 29/06* (2006.01)
*H04L 29/08* (2006.01)

(52) U.S. Cl.
CPC ............ *H04L 67/40* (2013.01); *H04L 67/145* (2013.01); *H04L 67/146* (2013.01); *H04L 67/306* (2013.01)

(58) Field of Classification Search
CPC ..... H04L 67/40; H04L 67/145; H04L 67/146; H04L 67/306
See application file for complete search history.

(56) References Cited

U.S. PATENT DOCUMENTS

| | | | |
|---|---|---|---|
| 2017/0085648 A1* | 3/2017 | Aw | G08B 13/19656 |
| 2017/0099347 A1* | 4/2017 | Pucha | H04L 63/101 |
| 2021/0203754 A1* | 7/2021 | Hao | H04L 67/104 |

FOREIGN PATENT DOCUMENTS

| | | | |
|---|---|---|---|
| CN | 106357744 A | * | 1/2017 |
| CN | 105515759 B | | 11/2018 |
| CN | 110768914 A | | 2/2020 |
| EP | 2946541 A0 | | 7/2014 |
| WO | 2014113196 A1 | | 7/2014 |

OTHER PUBLICATIONS

The Extended European search report for EP application No. EP21163436, dated Aug. 10, 2021.

* cited by examiner

*Primary Examiner* — Shean Tokuta
(74) *Attorney, Agent, or Firm* — Quinn IP Law (57) ABSTRACT

The present disclosure provides a method and an apparatus for acquiring remote-procedure-call (RPC) member information, an electronic device and a storage medium, and relates to the field of micro-services technologies in cloud services. The method includes: pushing, by nodes of a RPC cluster, respective local member lists of the nodes of the RPC cluster to each other, and merging, by each node of the RPC cluster, a received member list with a current local member list while performing deduplication until member lists of the nodes of the RPC cluster are synchronized.

20 Claims, 3 Drawing Sheets

```
                                                    101
┌─────────────────────────────────────────────────────────┐
│ pushing, by nodes of a RPC cluster, respective local    │
│ member lists of the nodes of the RPC cluster to each    │
│ other, and merging, by each node of the RPC cluster,    │
│ a received member list with a current local member list │
│ while performing deduplication until member lists of    │
│ the nodes of the RPC cluster are synchronized.          │
└─────────────────────────────────────────────────────────┘
``` pushing, by nodes of a RPC cluster, respective local member lists of the nodes of the RPC cluster to each other, and merging, by each node of the RPC cluster, a received member list with a current local member list while performing deduplication until member lists of the nodes of the RPC cluster are synchronized.

METHOD AND APPARATUS FOR ACQUIRING RPC MEMBER INFORMATION, ELECTRONIC DEVICE AND STORAGE MEDIUM

CROSS-REFERENCE TO RELATED APPLICATION

The present application claims a priority to the Chinese patent application No. 202011014305.X filed in China on Sep. 24, 2020, a disclosure of which is incorporated herein by reference in its entirety.

TECHNICAL FIELD

The present disclosure relates to the field of microservices technologies in cloud services, and in particular to a method and an apparatus for acquiring remote-procedure-call (RPC) member information, an electronic device and a storage medium.

BACKGROUND

In order to meet the scalability requirements, the microservice architecture is increasingly adopted in cloud services. Each micro-service is responsible for a single functional link. Micro-services communicate with each other and call each other in remote procedure call (RPC) manner.

Each RPC node needs to acquire relevant information about RPC members to ensure the normal operation of an entire system. At present, a centralized discovery mechanism is usually adopted to acquire RPC member information, that is, a "service registry" component is introduced in addition to the micro-services. An RPC node is registered in the "service registry" when it starts, and other RPC nodes acquire latest RPC member information dynamically from the "service registry". However, due to the additional introduction of the "service registry" component, not only the system complexity and operation and maintenance complexity of the cloud services are increased, but also potential single-point operation and maintenance risks may occur, for example, when the "service registry" fails, the entire system may be unavailable.

SUMMARY

A method and an apparatus for acquiring remote-procedure-call (RPC) member information, an electronic device and a storage medium are provided in the present disclosure.

In a first aspect, a method for acquiring RPC member information is provided, including: pushing, by nodes of a RPC cluster, respective local member lists of the nodes of the RPC cluster to each other, and merging, by each node of the RPC cluster, a received member list with a current local member list and performing deduplication until member lists of the nodes of the RPC cluster are synchronized.

In a second aspect, an apparatus for acquiring RPC member information is provided, including: a first synchronization module, configured to enable nodes of a RPC cluster to push respective local member lists of the nodes of the RPC cluster to each other, and enable each node of the RPC cluster to merge a received member list with a current local member list and perform deduplication until member lists of the nodes of the RPC cluster are synchronized.

In a third aspect, an electronic device is provided, including: at least one processor; and a memory in communication connection with the at least one processor; where, the memory has stored thereon instructions executable by the at least one processor, and the instructions, when executed by the at least one processor, cause the at least one processor to perform any one of the methods in the first aspect.

In a fourth aspect, a non-transitory computer-readable storage medium having stored thereon computer instructions is provided, the computer instructions are used for causing a computer to perform any one of the methods in the first aspect.

According to the present disclosure, the nodes of the RPC cluster pushes the respective local member lists of the nodes of the RPC cluster to each other, and each node of the RPC cluster merges the received member list with the current local member list and performing deduplication, such that the member lists of the nodes of the RPC cluster may be converged and synchronized eventually, and each node may acquire relevant information of all RPC members eventually, thereby ensuring the normal and stable operation of an entire cloud service system. The RPC member information may be acquired without manual intervention or introduction of the additional component in the present disclosure. Even if a network failure occurs, the member lists of the nodes may be converged and synchronized eventually after the network failure is eliminated.

It should be appreciated that the content described in this section is not intended to identify key or important features of the embodiments of the present disclosure, nor is it intended to limit the scope of the present disclosure. Other features of the present disclosure are easily understood based on the following description.

BRIEF DESCRIPTION OF THE DRAWINGS

The accompanying drawings are used for better understanding of solutions, but shall not be construed as limiting the present disclosure. In these drawings.

DETAILED DESCRIPTION

The following describes exemplary embodiments of the present disclosure with reference to accompanying drawings. Various details of the embodiments of the present disclosure are included to facilitate understanding, and should be considered as being merely exemplary. Therefore, those of ordinary skill in the art should be aware that various changes and modifications may be made to the embodiments described herein without departing from the scope and spirit of the present disclosure. Likewise, for clarity and conciseness, descriptions of well-known functions and structures are omitted below.

A method and an apparatus for acquiring remote-procedure-call (RPC) member information, an electronic device and storage medium are provided in the present disclosure, to resolve the problem of service discovery of RPC microservices. Before the present disclosure is described, the RPC micro-services and related technologies of service discovery of the RPC micro-services are introduced and described briefly.

In order to meet scalability requirements, the micro-service architecture is increasingly adopted in cloud services. Each micro-service is responsible for a single functional link. Micro-services communicate with each other and call each other in remote procedure call (RPC) manner, i.e., the RPC micro-services are formed. The RPC micro-service logically includes an RPC client and an RPC server. An RPC client process instance runs in a process space of an RPC server process instance during deployment.

During operation of an RPC micro-service system, the number of the process instances and operation information may change. Each RPC client needs to acquire such key operation information as a service address and a port about the RPC server to ensure the normal operation of an entire system. Thus, the service discovery of the RPC micro-services is involved, that is, each running RPC client process instance needs to acquire a latest running RPC server process instance list in real time.

In the related art, the number of RPC servers may be synchronized and updated manually in a static configuration manner, which is only suitable for a scenario of a small scale, a cluster scale changing infrequently, and low requirement for service level agreement (SLA). A centralized discovery mechanism is also adopted to achieve a service discovery process of the RPC client discovering the RPC server. Such a component as "service registry" is required to be introduced in addition to the micro-services in the centralized discovery mechanism. The RPC server is registered in the "service registry" when it starts, and the RPC client acquires a latest RPC server list dynamically from the "service registry". However, due to the additional introduction of the component, not only the system complexity and operation and maintenance complexity of the cloud services are increased, but also potential single-point operation and maintenance risks may occur, for example, when the component fails, the entire system may be unavailable.

In view of the above problems, a decentralized RPC micro-service dynamic discovery mechanism is provided to achieve dynamic discovery of RPC cluster members and acquire RPC member information.

The exemplary embodiments of the present disclosure are described below.

Figure 1:
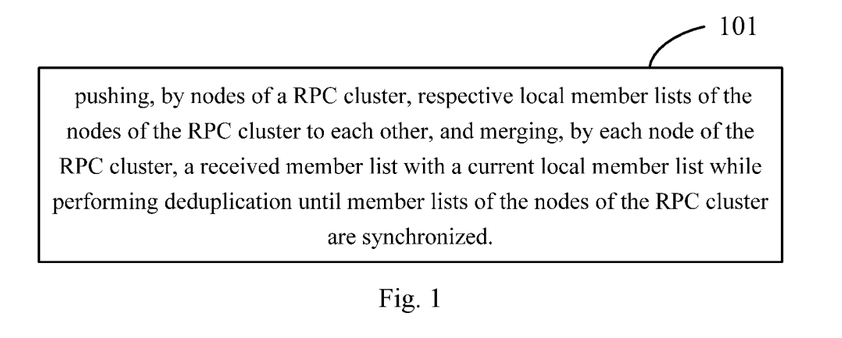
FIG. 1 is a schematic flow chart of a method for acquiring RPC member information according to one embodiment of the present disclosure.

As shown in FIG. 1, a method for acquiring RPC member information includes the following steps.

Step 101, pushing, by nodes of a RPC cluster, respective local member lists of the nodes of the RPC cluster to each other, and merging, by each node of the RPC cluster, a received member list with a current local member list and performing deduplication until member lists of the nodes of the RPC cluster are synchronized.

The RPC cluster may be understood as an application node cluster that includes running RPC client and RPC server process instances. Each process instance, whether it is of an RPC client or of an RPC server, is a node in the RPC cluster, and each node is a member of the RPC cluster.

The member list may be understood as a set of member information used to reflect or represent current states of members of a current cluster. The member list may include relevant information about some or all members of the RPC cluster. The member list is not limited to in a list form, and may also be in a form of topology diagram, label, sequence diagram, etc.

Each node of the RPC cluster may acquire the member list reflecting the current states of the members of the current cluster locally through a network asynchronous communication (peer-to-peer communication) provided by a host.

In the embodiment of the present disclosure, the nodes of the RPC cluster push their respective member lists to each other. When a node that receives member lists pushed by other nodes is referred to as a reception node, and a node that pushes a member list to other nodes is referred to as a sending node (or a push node), each node of the RPC cluster may act as the reception node of the member list or the sending node of the member list. A same member list is the current local member list for the sending node, and is the received member list (or a remote member list) for the reception node.

When a node acts as the reception node, the node may merge the received member list with its current local member list and perform deduplication. That is, during a process of merging the received member list with its current local member list, duplicate nodes need to be removed by the reception node, and the member list acquired after deduplication and merging is referred to as a currently updated local member list of the reception node.

The nodes of the RPC cluster may push their respective local member lists to each other according to pre-configured push rules. For example, each node may send the local member list to nodes in the local member list at the same time, or in batches or one by one.

In the embodiment of the present disclosure, the nodes of the RPC cluster pushes the respective local member lists of the nodes of the RPC cluster to each other, and each node of the RPC cluster merges the received member list with the current local member list and performing deduplication, such that the member lists of the nodes of the RPC cluster may be converged and synchronized eventually, and each node may acquire relevant information of all RPC members eventually. Even if a network failure, such as a network partition, occurs, the member lists of the nodes may be converged and synchronized eventually after the network failure is eliminated. Thus, the normal and stable operation of an entire cloud service system may be ensured. The embodiment of the present disclosure may be applied to a cloud platform and the Internet of Things.

The RPC member information may be acquired without manual intervention or introduction of the additional component in the present disclosure. The decentralized RPC micro-service dynamic discovery mechanism is achieved. Compared with the centralized RPC micro-service dynamic discovery mechanism, a difficulty in system operation and maintenance may be reduced, a system operation and maintenance risk may be reduced, and a system operation and maintenance efficiency may be improved.

Optionally, the pushing the respective local member lists of the nodes of the RPC cluster to each other by the nodes of the RPC cluster includes: pushing, by each node of the RPC cluster, the local member list to any node in the current local member list randomly at a preset time interval; and feeding back, by a node which received the member list, a current local member list of the node to a corresponding push node In the embodiment, the process of the pushing the respective local member lists of the nodes of the RPC cluster to each other by the nodes of the RPC cluster includes a push process and a feedback process. During the push process, each node of the RPC cluster randomly pushes the local member list to any node in the current local member list at the preset time interval. During the feedback process, the node which received the member list feeds back its current local member list to the corresponding push node.

The push process may be regarded as a main process, and the push process may be performed in an endless loop. If the push process is not executed immediately, one operation where the local member list is pushed to a remote node selected randomly (selecting a remote peer) is triggered at the preset time interval, such as T time units, and a push message is sent to achieve the push of the local member list.

When the node has received the member lists pushed by other nodes, the node may feed back the current local member list to the nodes that pushed the member lists. For example, when the node has received the push message, the node may feed back a pull message including the current local member list. The node may further merge the received member list with the local member list and perform deduplication, and an acquired new member list may be used as a new current local member list of the node. When the node has received the pull message, the node may perform the same deduplication and merging process as in the case where the push message has been received.

For example, the above process of member list convergence may be implemented through the following program or algorithm.

```
syncMain(localMemberList, immediate){
do forever
    if !immediate then wait(T time units)
    remotePeer = selectRemotePeer(localMemberList)
    push(localMemberList, remotePeer)
}
onPush(remoteMemberList, remotePeer){
    pull(localMemberList, remotePeer)
    localMemberList = merge(localMemberList, remoteMemberList)
}
onPull(remoteMemberList, remotePeer){
    localMemberList = merge(localMemberList, remoteMemberList)
}
```

By using the above process, when the number of the members of the RPC cluster is N, the convergence and synchronization of the RPC cluster member lists may be finished after $T*Log\,2(N)$. In this process, it may be ensured that, no matter what network abnormality occurs in the RPC cluster, the member lists of the nodes may be converged and synchronized eventually after the failure is eliminated.

A convergence and synchronization speed of the RPC cluster member list is affected by parameters T and N. In most cases, the RPC cluster operates normally. T may be selected as a relatively large value, such as a few minutes.

Optionally, in the process of merging the received member list with the current local member list and performing deduplication by each node of the RPC cluster, in a case that node states of a fourth node are different in different member lists, selecting a node state of a higher priority as a node state of the fourth node in the member lists.

The node state refers to a state of the node. The node state may include, for example, an alive state and a dead state. In the process of merging the member lists and performing deduplication by the node, a same node may exist in different member lists, and node states of the same node may be the same or different. In the case that the node states are the same, duplicates of the node may be removed, and only one node is retained. In the case that the node states are different, the node state of the node needs to be determined according to priorities of the node states.

In the embodiment of the present disclosure, the priorities of the node states may be determined only by the node states, or by combining the node states with update time of the node states.

For example, the node state of the fourth node is the dead state in the local member list, and the node state of the fourth node is the alive state in the received member list. Assuming that a priority of the alive state is higher than a priority of the dead state, when the node merges the member lists and performs deduplication, the node may change the node state of the fourth node in the local member list to the alive state. Assuming that the priority of the dead state is higher than the priority of the alive state, when the node merges the member lists and performs deduplication, the node may maintain the node state of the fourth node in the local member list as the dead state.

Considering that the node may change from the alive state to the dead state, and generally does not change from the dead state to the alive state, for the case where the node state includes the alive state and the dead state, the priority of the dead state may be higher than the priority of the alive state. In this way, when the node state of the fourth node in the local member list is the alive state, and the node state of the fourth node is the dead state in the received member list, the node status of the fourth node in the local member list may be changed to the dead state.

In the embodiment of the present disclosure, when the node states are different, by using the node state of the higher priority as the node state of the node in the member list, the node states in each member list may be synchronized, thereby making the node state of each node in each member list more accurate.

Optionally, the method further includes: in a case that a first node is newly added to the RPC cluster, performing, by the first node and a seed node, synchronization on the member lists of the first node and the seed node; sending, by the first node, an alive message to each node in a current local member list of the first node; and adding, by a node which received the alive message, the first node to a member list of the node.

The seed node may be understood as any running member node of the RPC cluster. The first node may randomly select a node from the RPC cluster as the seed node, or the system may designate a node as the seed node for the first node, etc.

In the embodiment of the present disclosure, the convergence of the RPC cluster member list may be achieved through the process of the nodes of the RPC cluster pushing their respective local member lists to each other, but the convergence process may be relatively slow for the synchronization of the newly added node. That is, when a node is newly added to the RPC cluster, the nodes of the RPC cluster may push their respective local member lists to each other, so as to achieve the synchronization of the new node in the local member lists of the nodes eventually. However, this process is generally slow.

In view of this, a fast synchronization solution for the newly added node is provided in the embodiment. When the first node is newly added to the RPC cluster, the first node may first synchronize the member list of the first node with the seed node, so that the first node may acquire the member list of the seed node, that is, the local member list of the first node may include member information in the member list of the seed node. Then the first node may send the alive message to each node in the current local member list, and the nodes that have received the alive message may add the first node to their respective local member lists.

It should be noted that, the convergence of the RPC cluster member lists may be achieved through the process of the nodes of the RPC cluster pushing their respective local member lists to each other, and convergence and synchronization of the member list of the seed node is achieved accordingly. At this time, the member list of the seed node includes information of all members of the current RPC cluster. Therefore, the first node acquires all the member information of the current RPC cluster by synchronizing the member list with the seed node. The alive message may be sent to any node in the current RPC cluster by the first node, thereby ensuring that any node in the current RPC cluster may add the first node to the local member list after receiving the alive message sent by the first node, thereby achieving the convergence and synchronization of the new member list.

In the embodiment, the process (joinMain) of adding the new node may be built under a framework of a Gossip communication algorithm of network asynchronous communication. Each newly added node may first finish the convergence process of the member list with the seed node immediately, and then send the alive message to each node of the RPC cluster through Gossip. A Gossip protocol is a protocol for information exchange between nodes or processes based on epidemic spread. It may be ensured that the alive message may be disseminated fast and the member lists may be updated in real time in a Gossip process.

In the embodiment, by using the above process, the addition of new nodes may be achieved more quickly, so that the convergence and synchronization of the member lists may be achieved more quickly.

Optionally, the performing synchronization on the member lists of the first node and the seed node by the first node and the seed node includes: adding, by the first node, the first node and the seed node to the member list of the first node; pushing, by the seed node and the first node, respective member lists to each other of the seed node and the first node; and merging, by the first node, the received member list with the current local member list of the first node and performing deduplication.

The member list received by the first node is the local member list of the seed node, and the current local member list of the first node is a member list including the first node and the seed node.

For example, the above process of adding new nodes may be implemented through the following program or algorithm.

```
joinMain(seed, localMemberList){
    add(localMemberList,self) //adding itself to the member list
    add(localMemberList,seed) //adding the seed node to the member list
    syncMain(localMemberList, true) //performing synchronization on the member list with the seed node
    gossip(localMemberList, alive) //disseminating alive information about itself to cluster members
}
onAlive(alive) {
    add(localMemberList, alive)
}
```

Optionally, the method further includes: when identifying that a third node is an abnormal node, sending, by a second node of the RPC cluster, an abnormal message to each node in the current local member list; and deleting, by nodes that have received the abnormal message, the third node from respective member lists of the nodes that have received the abnormal message, or marking the third node as the abnormal node in the respective member lists of the nodes that have received the abnormal message.

The members of the RPC cluster may fail or be abnormal at any time. When a failure or abnormality occurs, healthy nodes need to sense in real time and update the local member lists in time.

There may be some manners for one node to identify whether the other node is an abnormal node. In the embodiment, when identifying that the third node is the abnormal node, the second node of the RPC cluster may send the abnormal message (a dead message) to each node in the current local member list. The abnormal message is used to indicate that the third node is the abnormal node, and may include relevant information of the third node, such as a unique identification of the third node, description information of the third node, a network access address of the third node. The nodes that have received the abnormal message may delete the third node from the respective member lists of the nodes that have received the abnormal message, or mark the third node as the abnormal node in the respective member lists of the nodes that have received the abnormal message.

After the abnormal node is identified, the abnormal message about the abnormal node may also be disseminated to the entire RPC cluster through the Gossip process. It may be ensured that the abnormal message may be disseminated fast and the member lists may be updated in real time in the Gossip process.

In the embodiment, by using the above process, the abnormal message may be disseminated fast, so that the convergence and synchronization of the member lists may be achieved more quickly.

Optionally, a mode where the second node of the RPC cluster identifies that the third node is the abnormal node includes: sending, by the second node, a heartbeat monitoring request message to the third node; and when the second node has not received a heartbeat monitoring feedback message sent by the third node within a preset time period, identifying, by the second node, the third node as the abnormal node.

There are many solutions for identifying the abnormal node which is one of the failure detection in a distributed environment. In this embodiment, the existence of the other node may be confirmed by the one node through a heartbeat monitoring message (or a heartbeat message). The other node may be marked as an abnormal node by the one node when the heartbeat monitoring message has not been received for a certain time period. Specifically, the scheme for the second node to identify whether the third node is the abnormal node is as follows. The second node may send the heartbeat monitoring request message to the third node, and may mark the third node as the abnormal node when the second node hasn't received the heartbeat monitoring feedback message for the preset time period. The third node may be any node randomly selected by the second node from the local member list.

For example, the above process of identifying the abnormal node may be implemented through the following program or algorithm.

```
detectMain(localMemberList){
    remotePeer = selectRemotePeer(localMemberList) //randomly selecting a healthy remote node
    isDead = detect(remotePeer) //performing an abnormal detection
```

```
    if isDead then
        markDead(localMemberList, remotePeer) //marking an
abnormal node
        gossip(localMemberList, dead) //disseminating
the abnormal message through a Gossip algorithm
    }
    onDead(dead) {
        markDead(localMemberList, dead);
    }
```

In this embodiment, by using the above process, the abnormal node may be identified with a small number of messages, and a false identifying rate of the abnormal node is also small, thereby improving the identification efficiency and identification accuracy of the abnormal node.

Optionally, information of each node in the member lists includes at least one of the following: a unique identification of the node; a network access address of the node; a current node state of the node; and description meta information of the node.

The unique identification of the node may be represented as NodeId, the network access address of the node may be represented as Address, the current node state of the node may be represented as Status, such as Alive, Dead, and other node states, and the description meta information of the node may be represented as Metadata.

Optionally, the description meta information of the node is represented by a key-value pair, a key in the key-value pair is used to represent an agent cluster to which the node belongs, and a value in the key-value pair is used to represent a RPC role of the node in the agent cluster to which the node belongs, wherein the RPC role includes an RPC client or an RPC server.

In the embodiment, by defining the description meta information attached to the node, an operation role (i.e., the RPC role) of the node may be determined for each node according to an actual function. The RPC role may be either the RPC client or the RPC server. The description meta information of the node may be represented by a key-value pair. A set of nodes having a same key may form a set of virtual agent clusters. Value may identify the RPC role of the node in the corresponding agent cluster. Multiple RPC clients of other micro-services may run on a process node where an actual micro-service is located. Therefore, one node may be multiplexed for multiple agent clusters at the same time, which is equivalent to dynamically superimposing multiple virtual agent clusters on a cluster composed of the nodes.

Figure 2:
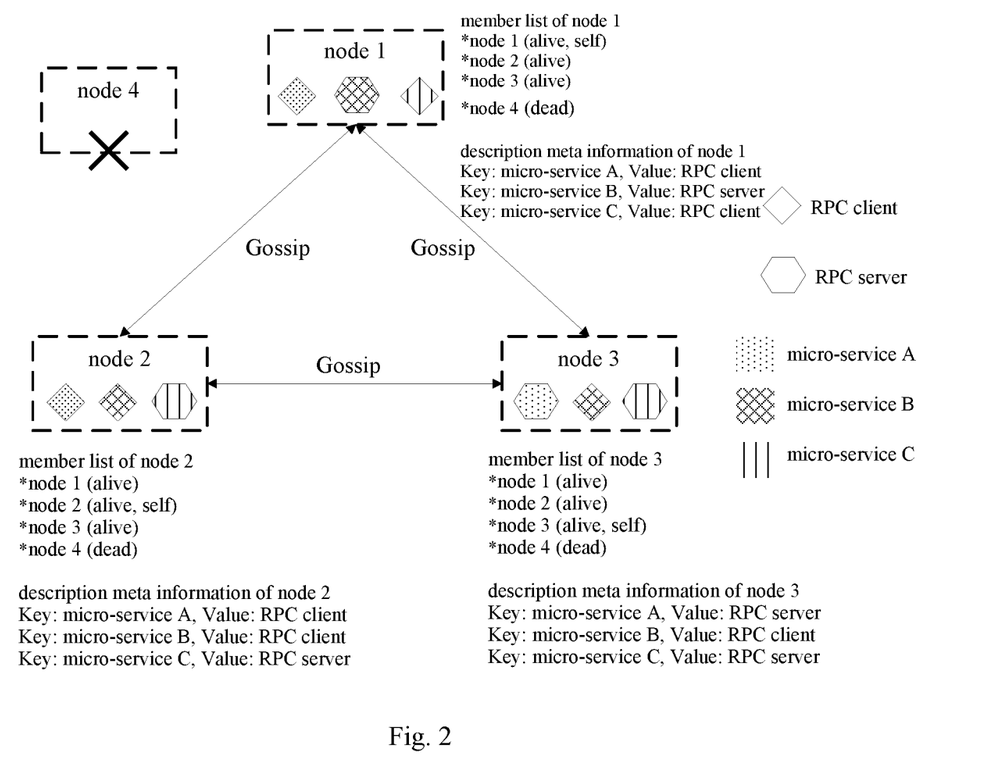
FIG. 2 is a schematic diagram of member information in an RPC cluster according to one embodiment of the present disclosure.

FIG. 2 is a schematic diagram of member information in an RPC cluster.

As shown in FIG. 2, assuming that the RPC cluster includes four nodes from a node 1 to a node 4, the node 1 to the node 3 are alive nodes, and the node 4 is a dead node. When convergence and synchronization of member lists of the nodes in the RPC cluster have achieved, the member lists of the node 1 to the node 3 each include node state information of the node 1 to the node 4.

As shown in FIG. 2, the node 1 to the node 3 are simultaneously multiplexed in three agent clusters, i.e., an micro-service A, an micro-service B and an micro-service C. In different agent clusters, the node 1 to the node 3 have respective RPC roles, and the RPC roles of the nodes in respective agent clusters are identified by the description meta information of the node 1 to the node 3 using the key-value pairs.

It should be noted that the various optional implementations in the method for acquiring the RPC member information in the present disclosure may be implemented in combination with each other or implemented separately, which is not limited in the present disclosure.

The above-mentioned embodiments of the present disclosure have at least the following advantages or beneficial effects.

In the embodiment of the present disclosure, the nodes of the RPC cluster pushes the respective local member lists of the nodes of the RPC cluster to each other, and each node of the RPC cluster merges the received member list with the current local member list and performing deduplication, such that the member lists of the nodes of the RPC cluster may be converged and synchronized eventually, and each node may acquire the relevant information of all RPC members eventually. Even if a network failure occurs, the member lists of the nodes may be converged and synchronized eventually after the network failure is eliminated. Thus, the normal and stable operation of an entire cloud service system may be ensured. The embodiment of the present disclosure may be applied to a cloud platform and the Internet of Things.

The RPC member information may be acquired without manual intervention or introduction of the additional component in the present disclosure. The decentralized RPC micro-service dynamic discovery mechanism is achieved. Compared with the centralized RPC micro-service dynamic discovery mechanism, the difficulty in system operation and maintenance may be reduced, the system operation and maintenance risk may be reduced, and the system operation and maintenance efficiency may be improved.

Figure 3:
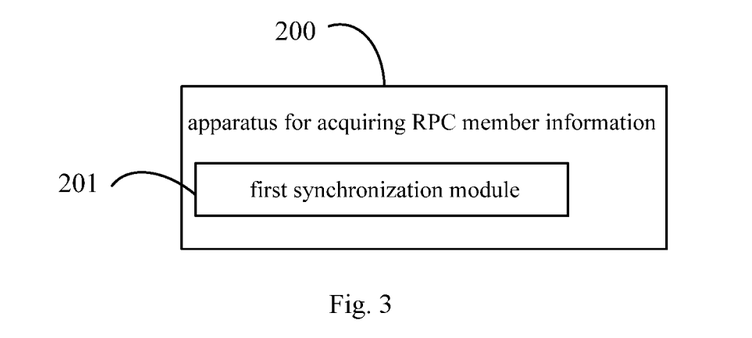
FIG. 3 is a schematic structural diagram of an apparatus for acquiring RPC member information according to one embodiment of the present disclosure.

As shown in FIG. 3, an apparatus 200 for acquiring RPC member information is provided, including: a first synchronization module 201, configured to enable nodes of a RPC cluster to push respective local member lists of the nodes of the RPC cluster to each other, and enable each node of the RPC cluster to merge a received member list with a current local member list and perform deduplication until member lists of the nodes of the RPC cluster are synchronized.

Optionally, the apparatus 200 for acquiring the RPC member information further includes: a second synchronization module, configured to, in a case that a first node is newly added to the RPC cluster, enable the first node and a seed node to perform synchronization on the member list of the first node and the seed node; a first sending module, configured to enable the first node to send an alive message to each node in a current local member list of the first node; and an adding module, configured to enable a node which received the alive message to add the first node to a member list of the node.

Optionally, the second synchronization module includes: an adding sub-module, configured to enable the first node to add the first node and the seed node to the member list of the first node; a first pushing sub-module, configured to enable the seed node and the first node to push respective member lists of the seed node and the first node to each other; and a merging sub-module, configured to enable the first node to merge the received member list with the current local member list of the first node and performing deduplication.

Optionally, the apparatus 200 for acquiring the RPC member information further includes: a second sending module, configured to, when identifying that a third node is an abnormal node, enable a second node of the RPC cluster to send an abnormal message to each node in the current local member list; and an abnormal processing module, configured to enable nodes that have received the abnormal message to delete the third node from respective member lists of the nodes that have received the abnormal message, or mark the third node as the abnormal node in the respective member lists of the nodes that have received the abnormal message.

Optionally, the apparatus 200 for acquiring the RPC member information further includes: a monitoring module, configured to enable the second node to send a heartbeat monitoring request message to the third node; and an identifying module, configured to, when the second node has not received a heartbeat monitoring feedback message sent by the third node within a preset time period, enable the second node to identify the third node as the abnormal node Optionally, the first synchronization module includes: a second pushing sub-module, configured to enable each node of the RPC cluster to push the local member list of each node of the RPC cluster to any node in the current local member list randomly at a preset time interval; and a feedback sub-module, configured to enable a node which received the member list to feed back a current local member list of the node to a corresponding push node.

Optionally, the first synchronization module is further configured to: in the process of enabling each node of the RPC cluster to merge the received member list with the current local member list and perform deduplication, in a case that node states of a fourth node are different in different member lists, select a node state of a higher priority as a node state of the fourth node in the member lists.

Optionally, the node states include an alive state and a dead state, and a priority of the dead state is higher than a priority of the alive state.

Optionally, information of each node in the member lists includes at least one of the following: a unique identification of the node; a network access address of the node; a current node state of the node; and description meta information of the node.

Optionally, the description meta information of the node is represented by a key-value pair, a key in the key-value pair is used to represent an agent cluster to which the node belongs, and a value in the key-value pair is used to represent a RPC role of the node in the agent cluster to which the node belongs, wherein the RPC role includes an RPC client or an RPC server.

The apparatus 200 for acquiring the RPC member information may implement each process in the embodiment of the method for acquiring RPC member information, and achieve same beneficial effects. To avoid repetition, details are not described herein again.

An electronic device and a readable storage medium are further provided in the present disclosure.

Figure 4:
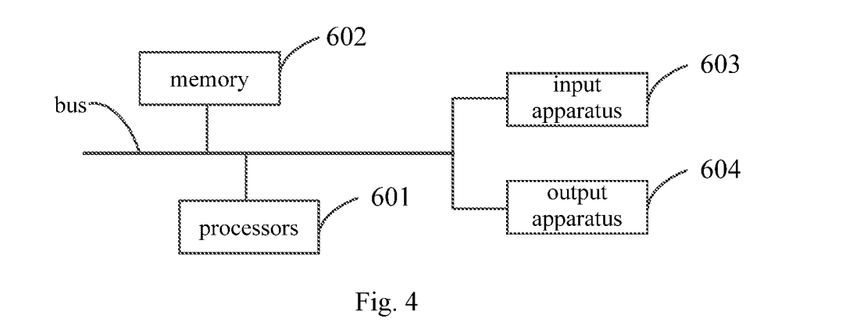
FIG. 4 is a block diagram of an electronic device configured to implement the method for acquiring the RPC member information according to one embodiment of the present disclosure.

FIG. 4 is a block diagram of an electronic device for implementing a method for acquiring remote-procedure-call (RPC) member information according to an embodiment of the present disclosure. Electronic devices are intended to represent digital computers in various forms, such as a laptop computer, a desktop computer, a workstation, a personal digital assistant, a server, a blade server, a mainframe computer, and another suitable computer. Electronic devices may further represent mobile apparatuses in various forms, such as personal digital processing, a cellular phone, a smart phone, a wearable device, and another similar computing apparatus. The components shown herein, connections and relationships thereof, and functions thereof are merely examples, and are not intended to limit the implementations of the present disclosure described and/or required herein.

As shown in FIG. 4, the electronic device includes one or more processors 601, a memory 602, and an interface for connecting various components, including a high-speed interface and a low-speed interface. The components are connected to each other by using different buses, and may be installed on a common motherboard or in other ways as required. The processor may process an instruction executed in the electronic device, including an instruction stored in or on the memory to display graphical information of a graphical user interface (GUI) on an external input/output apparatus (such as a display device coupled to an interface). In another implementation, if necessary, a plurality of processors and/or a plurality of buses may be used together with a plurality of memories. Similarly, a plurality of electronic devices may be connected, and each device provides some necessary operations (for example, used as a server array, a group of blade servers, or a plurality of processor systems). In FIG. 4, one processor 601 is used as an example.

The memory 602 is a non-transitory computer-readable storage medium provided in the present disclosure. The memory stores an instruction being executed by at least one processor to perform the method for acquiring the RPC member information provided in the present disclosure. The non-transitory computer-readable storage medium in the present disclosure stores a computer instruction, and the computer instruction is executed by a computer to execute the method for acquiring the RPC member information provided in the present disclosure.

As a non-transitory computer-readable storage medium, the memory 602 may be used to store a non-transitory software program, a non-transitory computer-executable program, and a module, such as a program instruction/module corresponding to the method for acquiring the RPC member information in the embodiment of the present disclosure (for example, the first synchronization module 201 shown in FIG. 3). The processor 601 executes various functional applications and data processing of the server by running the non-transient software program, instruction, and module that are stored in the memory 602, that is, implementing the method for acquiring the RPC member information in the foregoing method embodiment.

The memory 602 may include a program storage area and a data storage area. The program storage area may store an operating system and an application program required by at least one function. The data storage area may store data created based on use of an electronic device for acquiring the RPC member information. In addition, the memory 602 may include a high-speed random access memory, and may further include a non-transitory memory, such as at least one magnetic disk storage device, a flash memory device, or another non-transitory solid-state storage device. In some embodiments, the memory 602 may optionally include a memory remotely provided with respect to the processor 601, and these remote memories may be connected, through a network, to the electronic device for acquiring the RPC member information. Examples of the network include, but are not limited to, the Internet, the Intranet, an LAN, a mobile communication network, and a combination thereof.

The electronic device of the method for acquiring the RPC member information may further include: an input apparatus 603 and an output apparatus 604. The processor 601, the memory 602, the input apparatus 603 and the output apparatus 604 may be connected to each other through a bus or in other ways. In FIG. 4, a bus for connection is used as an example.

The input apparatus 603 may receive digital or character information that is inputted, and generate key signal input related to a user setting and function control of the electronic device for acquiring the RPC member information, such as a touch screen, a keypad, a mouse, a trackpad, a touchpad, and a pointing stick, one or more mouse buttons, a trackball, a joystick, or another input apparatus. The output apparatus 604 may include a display device, an auxiliary lighting apparatus (for example, an LED), a tactile feedback apparatus (for example, a vibration motor), and the like. The display device may include, but is not limited to, a liquid crystal display (LCD), a light emitting diode (LED) display, and a plasma display. In some implementations, the display device may be a touch screen.

The various implementations of the system and technology described herein may be implemented in a digital electronic circuit system, an integrated circuit system, an application specific integrated circuit (ASIC), computer hardware, firmware, software, and/or a combination thereof. The various implementations may include: being implemented in one or more computer programs, where the one or more computer programs may be executed and/or interpreted on a programmable system including at least one programmable processor, and the programmable processor may be a dedicated or general-purpose programmable processor, may receive data and an instruction from a storage system, at least one input apparatus, and at least one output apparatus, and transmit the data and instruction to the storage system, the at least one input apparatus, and the at least one output apparatus.

The calculation programs (also referred to as programs, software, software applications, or code) include a machine instruction of the programmable processor, and may be implemented by using a high-level procedure and/or an object-oriented programming language, and/or an assembly/machine language. As used herein, the terms "machine-readable medium" and "computer-readable medium" refer to any computer program product, device, and/or apparatus (such as a magnetic disk, an optical disc, a memory, or a programmable logic device (PLD)) configured to provide a machine instruction and/or data to the programmable processor, including a machine-readable medium that receive a machine instruction used as a machine-readable signal. The term "machine-readable signal" refers to any signal used to provide a machine instruction and/or data to the programmable processor.

To provide interaction with a user, the system and technology described herein may be implemented on a computer that is provided with: a display apparatus (such as a cathode ray tube (CRT) or an liquid crystal display (LCD) monitor) configured to display information to the user; and a keyboard and a pointing apparatus (such as a mouse or a trackball) through which the user may provide input to the computer. Other types of apparatuses may be further configured to provide interaction with the user, for example, a feedback provided to the user may be a sensory feedback in any form (for example, a visual feedback, an auditory feedback, or a tactile feedback); and may receive input from the user in any form (including acoustic input, voice input, or tactile input).

The system and technology described herein may be implemented in a computing system that includes a back-end component (for example, used as a data server), or a computing system that includes a middleware component (for example, an application server), or a computing system that includes a front-end component (for example, a user computer with a graphical user interface or a web browser, through which the user may interact with the implementation of the system and technology described herein), or a computer system that includes any combination of the back-end component, the middleware component, and the front-end component. The components of the system may be connected to each other through digital data communication (for example, a communication network) in any form or medium. Examples of the communication network include: a local area network (LAN), a wide area network (WAN), the Internet and a block chain network.

A computing system may include a client and a server. The client and the server are generally far away from each other and usually interact through the communication network. A client-server relationship is generated by computer programs that run on corresponding computers and that have a client-server relationship. The server may be a cloud server, also called as a cloud computing server or a cloud host. The server is a host product in a cloud computing service system to resolve problems such as management difficulties in a conventional physical host and a virtual private server (VPS) service, limited business scalability.

In the embodiment of the present disclosure, the nodes of the RPC cluster pushes the respective local member lists of the nodes of the RPC cluster to each other, and each node of the RPC cluster merges the received member list with the current local member list and performing deduplication, such that the member lists of the nodes of the RPC cluster may be converged and synchronized eventually, and each node may acquire relevant information of all RPC members eventually. Even if a network failure occurs, the member lists of the nodes may be converged and synchronized eventually after the network failure is eliminated. Thus, the normal and stable operation of an entire cloud service system may be ensured.

It should be appreciated that the various forms of processes shown above may be used to reorder, add, or delete steps. For example, the steps recorded in the present disclosure may be performed in parallel, sequentially, or in a different order, as long as a desired result of the technical solutions disclosed in the present disclosure can be achieved. This is not limited herein.

The foregoing specific implementations do not constitute a limitation on the protection scope of the present disclosure. Those skilled in the art should understand that various modifications, combinations, sub-combinations, and substitutions may be made according to design requirements and other factors. Any modifications, equivalent substitutions, improvements, or the like made within the spirit and principles of the present disclosure shall be included in the protection scope of the present disclosure.

What is claimed is:

1. A method for acquiring remote-procedure-call (RPC) member information, comprising:
    pushing, by nodes of a RPC cluster, respective local member lists of the nodes of the RPC cluster to each other, and
    merging, by each node of the RPC cluster, a received member list with a current local member list while performing deduplication, until member lists of the nodes of the RPC cluster are synchronized.

2. The method according to claim 1, further comprising:
    performing, by a first node and a seed node, synchronization on the member lists of the first node and the seed node, in a case that the first node is newly added to the RPC cluster;
    sending, by the first node, an alive message to each node in a current local member list of the first node; and
    adding, by a node which received the alive message, the first node to a member list of the node.

3. The method according to claim 2, wherein the performing synchronization on the member lists of the first node and the seed node by the first node and the seed node comprises:
adding, by the first node, the first node and the seed node to the member list of the first node;
pushing, by the seed node and the first node, respective member lists of the seed node and the first node to each other; and
merging, by the first node, the received member list with the current local member list of the first node and performing deduplication.

4. The method according to claim 1, further comprising:
when identifying that a third node is an abnormal node, sending, by a second node of the RPC cluster, an abnormal message to each node in the current local member list; and
deleting, by nodes that have received the abnormal message, the third node from respective member lists of the nodes that have received the abnormal message, or marking the third node as the abnormal node in the respective member lists of the nodes that have received the abnormal message.

5. The method according to claim 4, wherein a mode where the second node of the RPC cluster identifies that the third node is the abnormal node comprises:
sending, by the second node, a heartbeat monitoring request message to the third node; and
when the second node has not received a heartbeat monitoring feedback message sent by the third node within a preset time period, identifying, by the second node, the third node as the abnormal node.

6. The method according to claim 1, wherein the pushing the respective local member lists of the nodes of the RPC cluster to each other by the nodes of the RPC cluster comprises:
pushing, by each node of the RPC cluster, the local member list of each node of the RPC cluster to any node in the current local member list randomly at a preset time interval; and
feeding back, by a node which received the member list, a current local member list of the node to a corresponding push node.

7. The method according to claim 1, wherein in the process of merging the received member list with the current local member list and performing deduplication by each node of the RPC cluster, in a case that node states of a fourth node are different in different member lists, selecting a node state of a higher priority as a node state of the fourth node in the member lists.

8. The method according to claim 7, wherein the node states include an alive state and a dead state, and a priority of the dead state is higher than a priority of the alive state.

9. The method according to claim 1, wherein information of each node in the member lists comprises at least one of the following:
a unique identification of the node;
a network access address of the node;
a current node state of the node; and
description meta information of the node.

10. The method according to claim 9, wherein the description meta information of the node is represented by a key-value pair, a key in the key-value pair is used to represent an agent cluster to which the node belongs, and a value in the key-value pair is used to represent a RPC role of the node in the agent cluster to which the node belongs, wherein the RPC role comprises an RPC client or an RPC server.

11. An electronic device, comprising:
at least one processor; and
a memory in communication connection with the at least one processor; wherein,
the memory has stored thereon instructions executable by the at least one processor, and the instructions, when executed by the at least one processor, cause the at least one processor to perform a method for acquiring remote-procedure-call (RPC) member information, the method comprises:
pushing, by nodes of a RPC cluster, respective local member lists of the nodes of the RPC cluster to each other; and
merging, by each node of the RPC cluster, a received member list with a current local member list while performing deduplication, until member lists of the nodes of the RPC cluster are synchronized.

12. The electronic device according to claim 11, wherein the method performed by the at least one processor further comprises:
performing, by a first node and a seed node, synchronization on the member lists of the first node and the seed node, in a case that the first node is newly added to the RPC cluster;
sending, by the first node, an alive message to each node in a current local member list of the first node; and
adding, by a node which received the alive message, the first node to a member list of the node.

13. The electronic device according to claim 12, wherein in the method performed by the at least one processor, the performing synchronization on the member lists of the first node and the seed node by the first node and the seed node comprises:
adding, by the first node, the first node and the seed node to the member list of the first node;
pushing, by the seed node and the first node, respective member lists of the seed node and the first node to each other; and
merging, by the first node, the received member list with the current local member list of the first node and performing deduplication.

14. The electronic device according to claim 11, wherein the method performed by the at least one processor further comprises:
when identifying that a third node is an abnormal node, sending, by a second node of the RPC cluster, an abnormal message to each node in the current local member list; and
deleting, by nodes that have received the abnormal message, the third node from respective member lists of the nodes that have received the abnormal message, or marking the third node as the abnormal node in the respective member lists of the nodes that have received the abnormal message.

15. The electronic device according to claim 14, wherein in the method performed by the at least one processor, a mode where the second node of the RPC cluster identifies that the third node is the abnormal node comprises:
sending, by the second node, a heartbeat monitoring request message to the third node; and
when the second node has not received a heartbeat monitoring feedback message sent by the third node within a preset time period, identifying, by the second node, the third node as the abnormal node.

16. The electronic device according to claim 11, wherein in the method performed by the at least one processor, the pushing the respective local member lists of the nodes of the RPC cluster to each other by the nodes of the RPC cluster comprises:

pushing, by each node of the RPC cluster, the local member list of each node of the RPC cluster to any node in the current local member list randomly at a preset time interval; and     feeding back, by a node which received the member list, a current local member list of the node to a corresponding push node.

17. The electronic device according to claim 11, wherein in the method performed by the at least one processor, the process of merging the received member list with the current local member list and performing deduplication by each node of the RPC cluster, in a case that node states of a fourth node are different in different member lists, selecting a node state of a higher priority as a node state of the fourth node in the member lists.

18. The electronic device according to claim 17, wherein in the method performed by the at least one processor, the node states include an alive state and a dead state, and a priority of the dead state is higher than a priority of the alive state.

19. The electronic device according to claim 11, wherein in the method performed by the at least one processor, information of each node in the member lists comprises at least one of the following:

a unique identification of the node;

a network access address of the node;

a current node state of the node; and description meta information of the node.

20. A non-transitory computer-readable storage medium having stored thereon computer instructions used for causing a computer to perform the method of claim 1.

\* \* \* \* \*